(12) United States Patent
Kramer et al.

(10) Patent No.: US 7,843,990 B2
(45) Date of Patent: Nov. 30, 2010

(54) DETERMINING A CHANNEL MATRIX BY MEASURING INTERFERENCE

(75) Inventors: Gerhard Guenter Theodor Kramer, Chatham, NJ (US); Philip Alfred Whiting, New Providence, NJ (US); Miroslav Zivkovic, The Hague (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 726 days.

(21) Appl. No.: 11/897,877

(22) Filed: Aug. 31, 2007

(65) Prior Publication Data

US 2008/0247446 A1    Oct. 9, 2008

Related U.S. Application Data

(60) Provisional application No. 60/922,703, filed on Apr. 9, 2007.

(51) Int. Cl.
*H04L 27/30* (2006.01)
(52) U.S. Cl. .................. 375/146; 375/220; 375/267; 375/299; 370/278; 370/465; 370/480; 455/101; 455/115.1
(58) Field of Classification Search .......... 375/141, 375/144, 146, 148, 219–222, 267, 295, 299; 370/252, 278, 282, 319, 332, 344, 464, 465, 370/480; 455/501, 78, 101, 103, 115.1, 115.3
See application file for complete search history.

(56) References Cited

U.S. PATENT DOCUMENTS

| 7,260,153 | B2* | 8/2007 | Nissani (Nissensohn) ... 375/259 |
| 2003/0016626 | A1 | 1/2003 | Lagerberg et al. ........ 370/230.1 |
| 2003/0210750 | A1 | 11/2003 | Onggosanusi et al. ....... 375/295 |
| 2004/0264559 | A1 | 12/2004 | Cendrillon et al. .......... 375/219 |
| 2005/0141631 | A1* | 6/2005 | Takano ........................ 375/267 |
| 2006/0153178 | A1 | 7/2006 | Cendrillon et al. .......... 370/368 |
| 2008/0089442 | A1* | 4/2008 | Lee et al. ..................... 375/299 |

OTHER PUBLICATIONS

U.S. Appl. No. 11/848,684, filed Aug. 31, 2007, Adriaan De Lind Van Wijngaarden, et al.
U.S. Appl. No. 11/897,809, filed Aug. 31, 2007, Mamoun Guenach, et al.
U.S. Appl. No. 11/934,347, filed Nov. 2, 2007, Alexei Ashikhmin, et al.
U.S. Appl. No. 11/796,366, filed Apr. 26, 2002, Gerhard G. Kramer, et al.
Kihong Kim, et al, "Interference Mitigation in MIMO Systems by Subset Antenna Transmission" *Wireless Personal Communications*, Kluwer Academic Publishers, D0, vol. 40, No. 3, Aug. 9, 2006, pp. 305-315.
Raphael Cendrillon, et al, "Partial crosstalk precompensation in downstream VDSL" *Signal Processing*, Elsevier Science Publishers, vol. 84, No. 11, Nov. 1, 2004, pp. 2005-2019.

(Continued)

*Primary Examiner*—Dac V Ha
(74) *Attorney, Agent, or Firm*—John F. McCabe

(57) ABSTRACT

An apparatus includes a transmitter configured to transmit symbols to one or more receivers via a plurality of communication channels of a physical communication link. The transmitter is configured to estimate a phase of one or more off-diagonal elements of a channel matrix for the physical communication link based on values of signal-to-interference-plus-noise ratios at the one or more receivers.

17 Claims, 6 Drawing Sheets

OTHER PUBLICATIONS

M. Webb, et al, "Matrix structure and capacity bounds of MIMO channels in interference" *IEE Proceedings: Communications, Institution of Electrical Engineers*, GB, vol. 153, No. 4, Aug. 3, 2006, pp. 476-481.

D.P. Palomar, et al, "Optimum Joint Transmit-Receive Linear Processing for Vectored DSL Transmission with QoS Requirements", Conference Record of the 36$^{th}$. *Asilomar Conference on Signals, Systems, & Computers*, Pacific Grove, CA, Nov. 3-6, 2002; *Asilomar Conference on Signals, Systems, & Computers*, New York, NY, IEEE, US. vol. 1, pp. 388-392.

PCT International Search Report dated Aug. 27, 2008 (PCT/US2008/004232), 4 pgs.

* cited by examiner

DETERMINING A CHANNEL MATRIX BY MEASURING INTERFERENCE This application claims the benefit of U.S. provisional patent application No. 60/922,703, filed Apr. 9, 2007 by Gerhard Kramer, Philip A. Whiting, and Miroslav Zivkovic.

BACKGROUND

1. Field of the Invention

The invention relates to multi-channel communication systems.

2. Discussion of the Related Art

This section introduces aspects that may be helpful to facilitating a better understanding of the inventions. Accordingly, the statements of this section are to be read in this light and are not to be understood as admissions about what is in the prior art or what is not in the prior art.

A variety of communication systems use multiple channels to increase data rates and/or to separate different data streams being communicated. Examples of such systems include some wireless communication systems, digital subscriber line (DSL) systems, and dense wavelength division multiplexed (DWDM) systems. In such systems, the various channels share a portion of a physical communication link so that inter-channel crosstalk can occur between the channels. For example, a DSL system transmits the DSL tone for each channel over the same twisted copper wire pair. For that reason, a transmission on one DSL tone may be detected at a DSL receiver in the frequency channel of one or more other DSL tones. Generally, the presence of inter-channel crosstalk implies that a communication transmitted to one channel may, to some extent, be received on one or more other channels.

Many multi-channel communication systems can be described by the linear crosstalk model. The linear crosstalk model defines the relationship between the transmitted and received symbols in a communication time slot by the relation:

$$Y = H \cdot X + Z. \quad (1)$$

In eq. (1), the N-component complex vectors X, Y, and Z represent the transmitted symbol or signal, the received symbol or signal, and the noise, respectively. In particular, the k-th components $X_k$, $Y_k$, and $Z_k$ of these vectors are the transmitted signal, the received signal, and the noise signal on the k-th channel. The N×N complex matrix, H, will be referred to as the channel matrix. The (k, m)-th component $H_{k,m}$ describes how the physical communication link produces a signal on the k-th channel in response to a symbol being transmitted to the m-th channel. The diagonal elements of the channel matrix, H, describe direct channel couplings, and the off-diagonal elements of the channel matrix, H, describe inter-channel couplings.

BRIEF SUMMARY

Various embodiments provide methods and apparatus that can estimate the channel matrix of a physical communication link in a multi-channel communication system. In particular, the embodiments rely on measured signal-to-interference-plus-noise ratios (SINR) to determine one or more off-diagonal elements of the channel matrix. The measured SINRs enable the determination of the relative phase(s) of said off-diagonal elements.

A first embodiment features an apparatus that includes a transmitter. The transmitter is configured to transmit symbols to one or more receivers via a plurality of communication channels of a physical communication link. The transmitter is configured to estimate a phase of one or more off-diagonal elements of a channel matrix for the physical communication link based on values of signal-to-interference-plus-noise ratios at the one or more receivers.

A second embodiment features a method. The method includes receiving a plurality of measurements of signal-to-interference-plus-noise ratios for one or more receivers. The one or more receivers are coupled to a transmitter via a physical communication link. The physical communication link supports a plurality of communications channels between the transmitter and the one or more receivers. The method also includes determining a phase of one or more off-diagonal elements of a channel matrix for the physical communication link based on the received plurality of signal-to-interference-plus-noise ratios.

BRIEF DESCRIPTION OF THE DRAWINGS

In the Figures and text, like reference numerals indicate elements with similar functions.

In the Figures, the relative dimensions of some features may be exaggerated to more clearly show one or more of the structures being illustrated therein.

Herein, various embodiments are described more fully by the Figures and the Detailed Description of Illustrative Embodiments. Nevertheless, the inventions may be embodied in various forms and are not limited to the specific embodiments that are described in the Figures and Detailed Description of Illustrative Embodiments.

DETAILED DESCRIPTION OF ILLUSTRATIVE EMBODIMENTS

Herein, some embodiments may incorporate apparatus and/or methods described in U.S. patent application Ser. No. 11/897,809 entitled "DETERMINING CHANNEL MATRICES BY CORRELATED TRANSMISSIONS TO DIFFERENT CHANNELS", by Mamoun Guenach, Gerhard Kramer, Jerome Louveaux, Jochen Maes, Michael Peeters, Luc Vandendorpe, Jan Verlinden, Philip Whiting, Geert Ysebaert, and Miroslav Zivkovic; and/or described in U.S. patent application Ser. No. 11/874,684 entitled "METHOD AND APPARATUS FOR SELF-TUNING PRECODER", by Adriaan de Lind van Wijngaarden, Gerhard Kramer, Philip Whiting, and Miroslav Zivkovic. The two above-cited U.S. Patent Applications are being filed on the same date as the present U.S. Patent Application and are incorporated herein by reference in their entirety.

Herein, some embodiments may incorporate apparatus and/or methods described in U.S. patent application Ser. No. 11/796,366 filed on Apr. 26, 2007 by Gerhard Kramer, Carl Nuzman, Philip Whiting, and Miroslav Zivkovic. This U.S. Patent Application is also incorporated by reference herein in its entirety.

This application also incorporates by reference herein in its entirety U.S. provisional patent application No. 60/922,703, filed Apr. 9, 2007 by Gerhard Kramer, Philip A. Whiting, and Miroslav Zivkovic.

Figure 1:
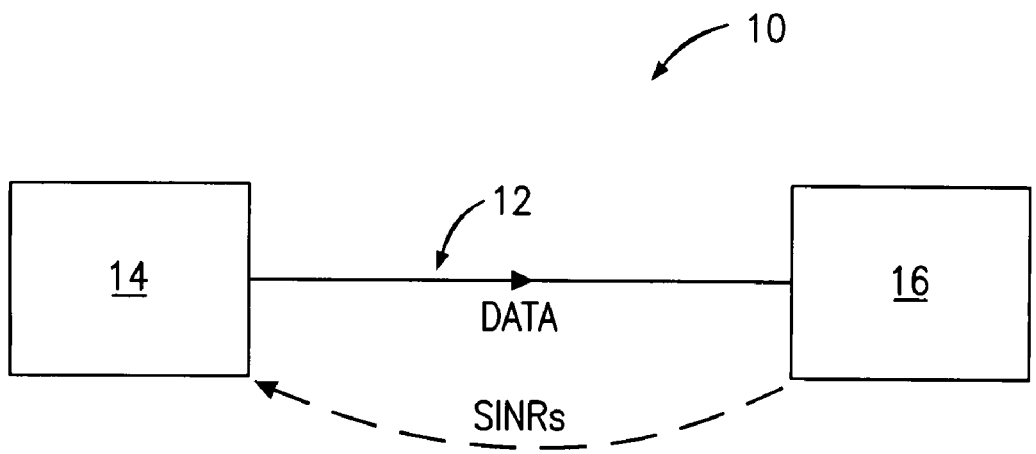
FIG. 1 is a block diagram that schematically illustrates an embodiment of a multi-channel communication system.

Various embodiments estimate a channel matrix, H, of communication system 10, which is illustrated schematically in FIG. 1. The communication system 10 includes a physical communication link 12, a transmitter 14, and one or more receivers 16. The physical communication link 12 supports N different communication channels over which the transmitter 14 can transmit streams of data symbols to the one or more receivers 16.

In the communication system 10, the physical communication link 12 also causes inter-channel crosstalk that can cause a data symbol, which is transmitted on one channel, to be received on multiple channels at the one or more receiver(s) 16. The transmission properties of the physical communication link 12 may be described by the linear crosstalk model of eq. (1), wherein the channel matrix, H, is a complex N×N channel matrix. Due to the inter-channel crosstalk, it may be desirable to estimate one or more of the off-diagonal elements of the channel matrix, H, e.g., to pre- or post-compensate the crosstalk that is produced by the physical communication link 12. The transmitter 14 is configured to make such estimations, e.g., without relying on a communication protocol that supports exchanges of direct measurements of said off-diagonal elements.

In particular, the one or more receivers 16 measure one or more channel SINRs or measure objects directly indicative of values of such channel SINRs. Herein, channel SINR refers to a single-channel's SINR or to an SINR that is averaged over a few neighboring frequency bands, e.g., the SINR at a DSL modem for a single local communication loop of a DSL communication system averaged over several neighboring DSL tones. The one or more receivers 16 may do such measurements during communications session initializations and/or during regular data transmission. The one or more receiver(s) 16 are configured to transmit said measurements of the channel SINR(s) or said objects directly indicative thereof to the transmitter 14, e.g., via the physical communication link 12.

Figure 2:
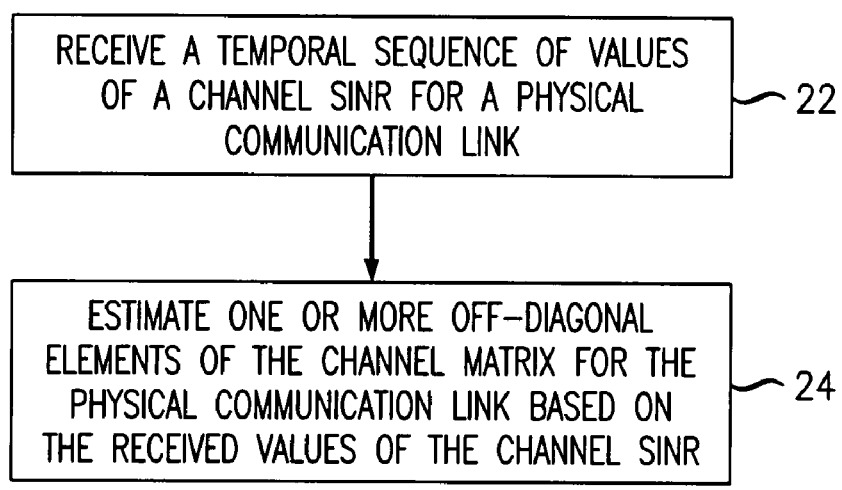
FIG. 2 is a flow chart illustrating a method for estimating one or more off-diagonal elements of a channel matrix for a physical communication link supporting multiple channels, e.g., in the multi-channel communication system of FIG. 1.

In the communication system 10, the transmitter 14 estimates off-diagonal elements of the channel matrix, H, based on values of channel SINR(s), e.g., via method 20 of FIG. 2.

Referring to FIG. 2, the method 20 includes receiving a temporal sequence of measured values of a channel SINR for a physical communication link, e.g., a single-channel SINR or a channel SINR averaged over a few neighboring frequency bands (step 22). In some embodiments, the transmitter 14 may receive, e.g., via the reverse physical communication link 12, values of the channel SINR that have been directly measured by the one or more receivers 16. In other embodiments, the transmitter 14 may receive measured values of one or more channel properties that are directly indicative of the channel SINR when combined with direct-transmission properties of the channel. That is, the transmitter 14 of such embodiments evaluates the channel SINR from measured values of the one or more channel properties and the direct transmission properties of the channel, e.g., as described below. Exemplary of such direct transmission properties are the power transmitted to the single channel and the direct gain of the single channel.

At step 22, the receiver of the measured channel SINRs may know the particular form of data symbols transmitted during the time slots in which the channel SINRs are measured. For example, there may be a known correspondence between the forms of the transmitted data symbols and the SINRs received at step 22.

The method 20 includes estimating one or more off-diagonal elements of the channel matrix, e.g., to find a phase thereof, for the physical communication link coupling the transmitter to the one or more receivers (step 24). The one or more off-diagonal elements are estimated based on the measured values of channel SINRs that were received at the step 22. In some embodiments, known forms of individual transmitted data symbols are used along with the measured values of channel SINRs to estimate each off-diagonal element of the channel matrix. In some embodiments, the values of channel SINRs or single-channel SINRs are used to estimate the entire off-diagonal portion of the channel matrix for the physical communication link 12.

Herein, phase may refer to either a phase angle or a phase factor. An estimate of a phase angle and an estimate of a trigonometric function of the phase angle are both estimates of the phase angle. For example, evaluating the real an imaginary parts of a complex number provides an estimate of a phase of the complex number. Also, herein, a phase may refer to a relative phase or an absolute phase.

In the method 20, the channel matrix, H, is preferably substantially constant over the time period over which the sequence of SINRs are measured and used to estimate one or more of the off-diagonal elements of the channel matrix, H. For example, the diagonal elements of the channel matrix that have the largest magnitude may change by less than about 10 percent over said time period.

FIGS. 3-6 illustrate different specific embodiments of the multi-channel communication system 10 shown in FIG. 1.

Figure 3:
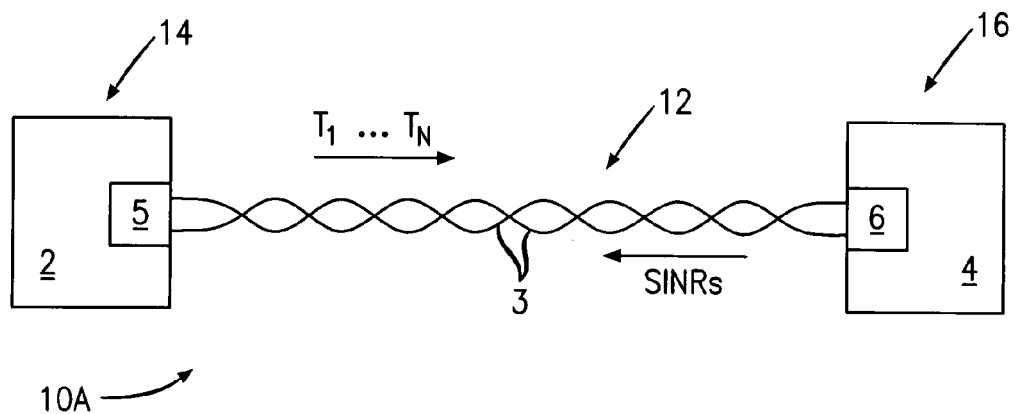
FIG. 3 is a block diagram illustrating a digital subscriber line (DSL) communication system that is one embodiment of the multi-channel communication system of FIG. 1.

FIG. 3 illustrates part of a digital subscriber line (DSL) communication system 10A. The DSL communication system 10A includes a central telephone office 2, a local communication loop 3, and a single DSL subscriber 4. The central telephone office 2 and its DSL modem 5 function as the transmitter 10 of FIG. 1. The local communication loop 3, e.g., a twisted pair of copper wires, functions as the physical communication link 12 of FIG. 1. The DSL modem 6 of the DSL subscriber 4 functions as the receiver 16 of FIG. 1. In the DSL communication system 10A, each channel is a frequency range for one of the DSL tones, i.e., tones $T_1, \ldots,$ and $T_N$. Each DSL tone may be used to transmit a communications symbol stream between the DSL modems 5, 6 of the central telephone office 2 and the DSL subscriber 4. The DSL tones $T_1, \ldots,$ and $T_N$ are closely spaced in frequency so that transmitting a symbol on one of the DSL tones, e.g., $T_k$, can cause the stream to be detected at the modem 6 of the DSL subscriber in a frequency range of another of the DSL tones, e.g., $T_m$ with m≠k. In the DSL communication system 10A, the modem 6 of the DSL subscriber 4 measures values of one or more channel SINRs or channel properties directly indicative thereof at initialization and/or regularly during ordinary operation. The modem 6 of the DSL subscriber 4 transmits such measured values to the modem 5 of the central telephone office 2 via the same local communication loop 3.

Figure 4:
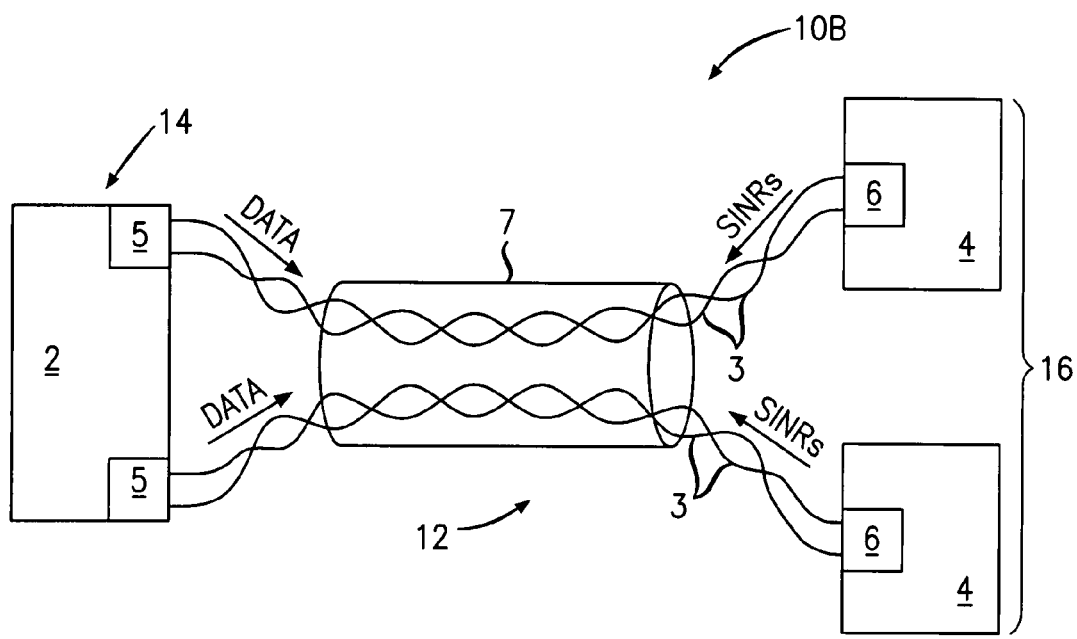
FIG. 4 is a block diagram illustrating another DSL communication system that is another embodiment of the multi-channel communication system of FIG. 1.

FIG. 4 illustrates a part of a DSL communication system 10B that includes a central telephone office 2, a plurality of local communication loops 3, and a plurality of DSL subscribers 4. The central telephone office 2 and its plurality of DSL modems 5 function together as the transmitter 10 of FIG. 1. The plurality of local communication loops 3 functions as the physical communication link 12 of FIG. 1. The plurality of DSL modems 6 of the separate DSL subscribers 4 functions as the one or more receivers 16 of FIG. 1. In this embodiment, each local communication loop 3 forms a separate direct channel of the physical communication link 12. Each such channel is in correspondence with one of the DSL modem 6 of a DSL subscriber 4 and with one of the DSL modems 5 of the central telephone office 2.

In FIG. 4, the local communication loops 3 have crosstalk there between, because some of their twisted pairs of copper wires share the same binder(s) or cable(s) 7. In the binder(s) or cable(s) 7, the nearness of twisted pairs of copper wires of the different local communication loops 3 may cause crosstalk there between. The crosstalk can cause a data stream, which is transmitted over a tone by one DSL modem 5 of the central telephone office 2, to be detected by the DSL modems 6 of more than one DSL subscriber 4. For that reason, off-diagonal elements of the channel matrix may be nonzero in the DSL communication system 10B. The modems 6 of the DSL subscribers 4 measure values of channel SINR(s) or one or more channel properties directly indicative thereof at initialization and/or regularly during ordinary operation. The modems 6 of the DSL subscribers 4 transmit such measured values to the modems 5 of the central telephone office 2 via the local communication loops 3.

Some embodiments of the communication system 10B of FIG. 4 may also use multiple DSL tones to transmit data between the DSL modems 5, 6. Then, an individual channel is indexed by a single local communication loop 3 and a DSL tone or alternatively, is indexed by a single local communication loop 3 and a disjoint group of a few neighboring DSL tones. In such embodiments, a close spacing of the DSL tones, i.e., $T_1, \ldots, T_N$, and/or a close proximity of the twisted pairs of copper wires of different ones of the local communication loops 3 may produce nonzero off-diagonal elements in the channel matrix that describes such a physical communication link 12.

Some embodiments of the DSL communication system 10B of FIG. 4 may transmit data to DSL subscribers 4 as described in U.S. Provisional Application No. 60/795,369, filed by Gerhard Kramer et al on Apr. 26, 2006. The disclosure of this U.S. Provisional Application is incorporated herein by reference in its entirety.

Figure 5:
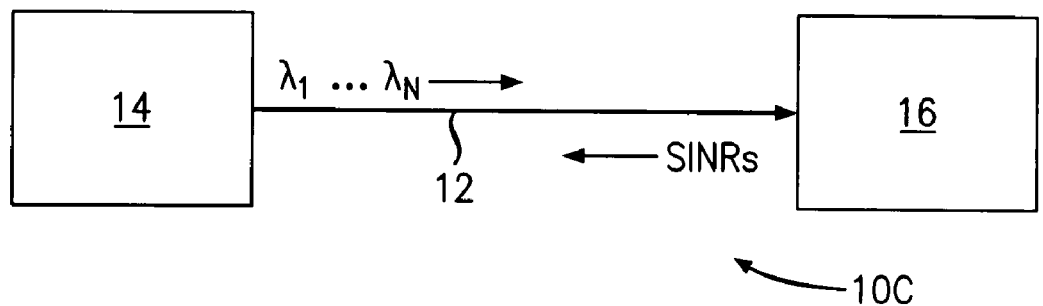
FIG. 5 is a block diagram illustrating a dense wavelength-division multiplexed (DWDM) optical communication system that is another embodiment of the multi-channel communication system of FIG. 1.

FIG. 5 illustrates a DWDM optical communication system 10C that includes a fiber optical transmission line 12, an optical transmitter 14, and an optical receiver 16. The same fiber optical transmission line 12 functions as the physical communication link 12 of FIG. 1 and supports transmissions of optical data symbols on a set of wavelength channels $\lambda_1, \ldots, \lambda_N$. The wavelength channels $\lambda_1, \ldots, \lambda_N$ are closely spaced so that a transmission of optical data symbols on one of the wavelength channels, e.g., $\lambda_K$, may cause the optical receiver 16 to detect optical data symbols on one or more other of the wavelength channels, e.g., the channels $\lambda_j$ for j≠k. The optical receiver 16 measures values of the SINR(s) for one or more wavelength channels or DWDM channel properties directly indicative thereof at initialization and/or regularly during ordinary operation. The optical receiver 16 transmits such measured values to the optical transmitter 14, e.g., a fiber optical transmission link 12.

Figure 6:
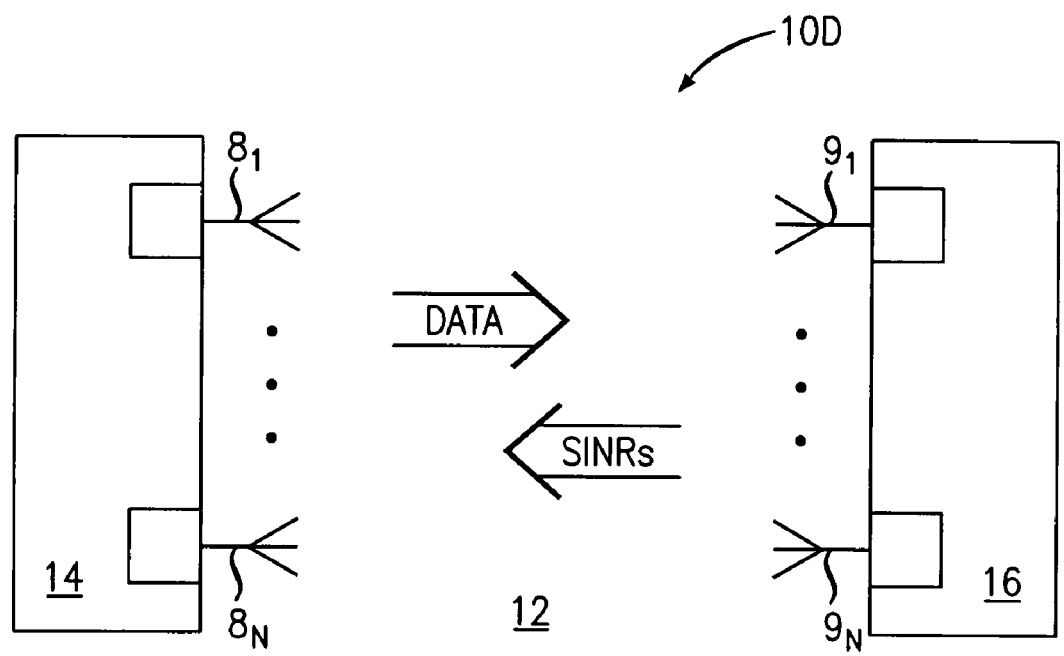
FIG. 6 is a block diagram illustrating a multiple-input multiple-output (MIMO) wireless communication system that is another embodiment of the multi-channel communication system of FIG. 1.

FIG. 6 illustrates a portion of a multiple-input multiple-output (MIMO) wireless communication system 10D. In the MIMO communication system 10D, a free space communication link 12 carries transmitted data symbols from a wireless transmitter 14 to a wireless receiver 16. The wireless transmitter 14 has a plurality of independent transmission devices $8_1, \ldots, 8_N$, and the wireless receiver 16 has a plurality of independent receiver devices $9_1, \ldots, 9_N$. The free space communication link 12 inter-connects the transmission devices $8_1, \ldots, 8_N$ and the receiver devices $9_1, \ldots, 9_N$ so that the channel matrix for the free space communication link 12 may have both nonzero diagonal elements and nonzero off-diagonal elements. The wireless receiver 16 measures SINRs for each of the receiver devices $9_1, \ldots, 9_N$ or one or more channel properties directly indicative thereof during initialization and/or regularly during ordinary operation. The wireless receiver 16 transmits such measured values to the wireless transmitter 14, e.g., via the same free space communication link 12.

Figure 7:
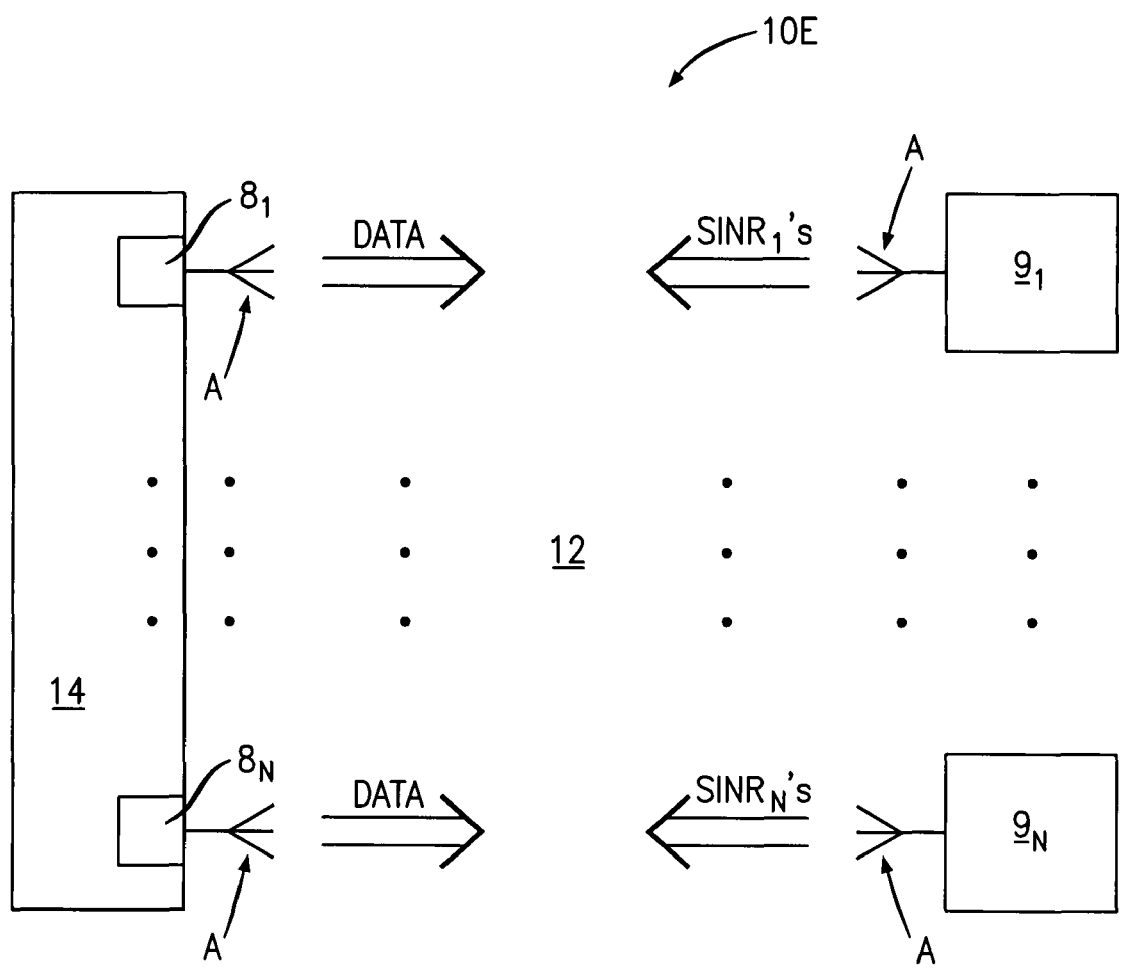
FIG. 7 is a block diagram illustrating another wireless communication system that is another embodiment of the multi-channel communication system of FIG. 1.

FIG. 7 illustrates an alternate wireless communication system 10E in which the single wireless receiver 16 of FIG. 6 is replaced by a plurality of separate wireless receivers $9_1, \ldots, 9_N$. Again, the wireless transmitter 14 has a plurality of independent transmission devices $8_1, \ldots, 8_N$, and the free space link 12 inter-connects the transmission devices $8_1, \ldots, 8_N$ to the separate receivers $9_1, \ldots, 9_N$. Due to the free space form of the link 12, the channel matrix may have nonzero diagonal and off-diagonal elements. Each wireless receiver $9_1, \ldots, 9_N$ measures values of its own SINR or one or more channel properties directly indicative thereof at initialization and/or regularly during ordinary operation. Each wireless receiver $9_1, \ldots, 9_N$ transmits such measured values to the wireless transmitter 14.

Referring again to FIG. 1, the transmitter 14 and/or one or more receivers 16 perform(s) a limited set of direct measurements of physical properties of the N channels that are supported by the physical communication link 12. Typically, the direct measurements do not include measurements of off-diagonal elements of the channel matrix, H. The direct measurements do however, enable an evaluation of one or more channel SINRs at a sequence of times, e.g., of single-channel SINRs or single-channel SINRs averaged over a small group of neighboring frequency bands. From such a limited set of direct measurements, the transmitter 14 estimates one or more off-diagonal elements of the channel matrix, H, for the physical communication link 12, e.g., up to an absolute percolumn phase thereof. The estimations of element(s) of the channel matrix, H, are typically performed faster than the channel matrix, H, substantially changes. For example, each estimation may be done in a time period over which the magnitude of the off-diagonal element of largest magnitude changes in magnitude by less than 10% or even by less than 1%.

For a channel "k", the set of direct measurements performed may include measurements of a direct channel gains, $d_k$, transmitted channel powers, $P_k$, and channel-k SINRs. The SINR of the k-th channel at about a time "t" will be referred to as the $SINR_k[t]$. The direct gain of channel-k, i.e., $d_k$, is the ratio $Y_k/X_k$ in the absence of crosstalk and noise or a temporal average thereof. The direct channel gain, $d_k$, accounts for delay and attenuation of transmissions over the k-th channel of the physical communication link 12. The direct channel gain, $d_k$ is also a diagonal element of the channel matrix, i.e., $H_{k,k}=d_k$. The transmitted channel power, $P_k$, is the power that the transmitter 14 actually transmits to the k-th channel or a temporal average thereof. The channel-k SINR, i.e., $SINR_k[t]$, defines the quality of the k-th channel at the time "t" and may be evaluated from:

$$SINR_k[t] = \frac{[E(|d_k X_k|^2)]}{[E(|Y_k - d_k X_k|^2)]}. \quad (1a)$$

Above, $E(U)$ is a temporal average of U over a sequence of communication time slots, e.g., a sequence of consecutive time slots, wherein the sequence is temporally at or near the time "t". The object $|Y_k|^2$ is the total channel-k power that is received by the one or more receivers 16, i.e., averaged over a time slot. The object $|Y_k-d_k \cdot X_k|^2$ is the sum of the crosstalk power and noise power on channel-k as received by the one or more receivers 16 and averaged over a communication time slot. In determining the channel-k SINR, i.e., $SINR_k[t]$, the one or more receivers 16 may average $E(|Y_k-d_k \cdot X_k|^2)$ over a sequence of time slots so that the relation $E(|Y_k-d_k \cdot X_k|^2)= E(|Y_k|^2)-|d_k \cdot X_k|^2$ is substantially valid. This averaging over a sequence of time slots can significantly cancel contributions of noise in the averaged objects $E(|Y_k-d_k \cdot X_k|^2)$ and $E(|Y_k|^2)$. In light of such temporal averaging, equation (1a) can typically be rewritten in the form:

$$SINR_k[t] = \frac{[|d_k|^2 P_k]}{[E(|Y_k|^2) - |d_k|^2 P_k]} \quad (1b)$$

Here, $|d_k|^2 \cdot P_k$ is the direct channel-k power, which is received by the one or more receivers 16 at time "t". Both forms of $SINR_k[t]$, i.e., eq. (1a) or eq. (1b), are used for special transmitted signals in the embodiments described herein.

In various embodiments, values of $d_k$, $P_k$, and/or ($SINR_k[t]$) may be obtained via single-end line tests (SELTs) or dual-end line tests (DELTs) at run time and/or via initialization protocols. Values of $d_k$, $P_k$, and/or ($SINR_k[t]$) may be obtained through measurements made by the transmitter 14 and/or by the one or more receivers 16. For example, once in each N time slots, the one or more receivers 16 may evaluate $|Y_k|^2$ and then, average $|Y_k|^2$ over the time slots of a period of about 0.5 seconds or longer to obtain $E(|Y_k|^2)$. The one or more receivers 16 may then, solve equation (1b) to obtain a measurement of $SINR_k[t]$.

Some embodiments exploit a communication protocol of the one or more receivers 16, which provides for measuring channel SINRs, i.e., the $SINR_k[t]$'s. For example, the VDSL 2 standard provides that some DSL transceivers will measure values of SINRs averaged over a group of a few neighboring DSL tones and will then, transmit such measured values of SINRs to the DSL transceiver with which they communicate via the VDSL 2 protocol. Herein, channel SINR refers to either an SINR of a single channel or an SINR for a channel averaged over a few neighboring frequency channels. An exemplary channel SINR is the value of the SINR at a receiver for a local communication loop 3 in a DSL communication system, wherein the value is averaged over about 3 to 10 neighboring DSL tones.

Figure 8:
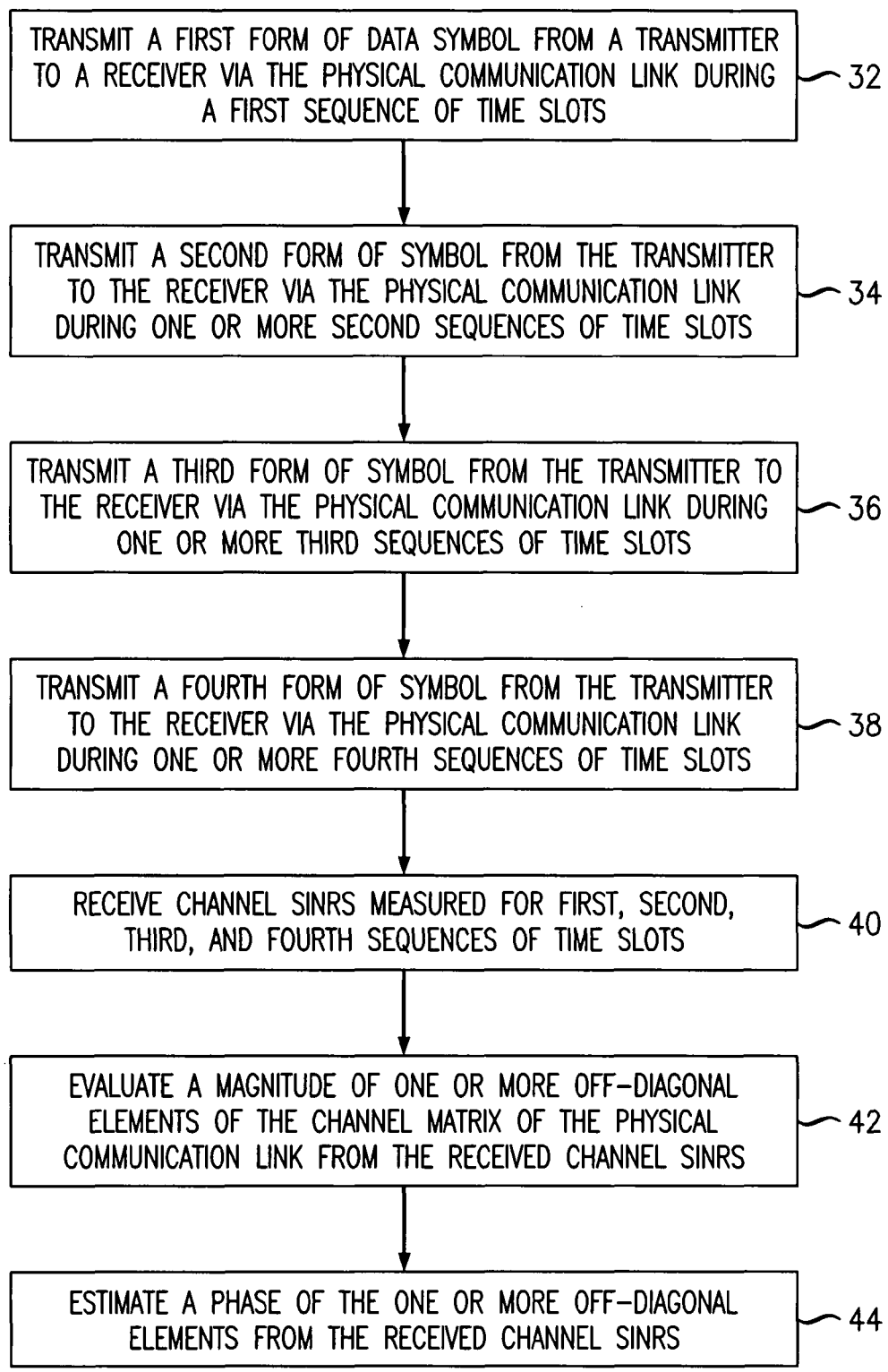
FIG. 8 is a flow chart illustrating a method of evaluating the magnitude and relative phase of one or more off-diagonal element(s) of a channel matrix, e.g., according to the method of FIG. 2.

Referring to FIG. 2, the method 20 may involve estimating the magnitude and a phase of one or more off-diagonal elements of a channel matrix according to method 30 of FIG. 8. For example, the transmitter 14 of FIGS. 1, 3, 4, 5, 6, and 7 may perform the method 30 to estimate one or more such off-diagonal element(s) of the channel matrix for the physical communication link 12.

In some embodiments, the method 30 is performed while transmitting data over the physical communication link between the transmitter and the one or more receivers. These embodiments are referred to as show-time embodiments.

In some embodiments, the method 30 is performed while not transmitting data over the physical communication link between the transmitter and the one or more receivers. Such embodiments are referred to as quiet-time embodiments.

The method 30 includes, at a time to, transmitting symbols of a first form, i.e., X's, from the transmitter to the one or more receivers via the physical communication link during a first sequence of consecutive communication time slots (step 32). In a quiet-time embodiment, the transmitter may transmit a preset sequence to the one or more receivers in the time slots of the first sequence. For example, the preset sequence may be a fixed pilot sequence, a sequence of the same data symbol X, a sequence of +X's and −X's, a sequence of null symbols, or another preset sequence. In a show-time embodiment, the transmitter may transmit a sequence of substantially arbitrarily varying data symbols, X, to the one or more receivers in the time slots of the first sequence, e.g., symbols belonging to a fixed constellation for transmitting digital data via the physical communication channel. That is, the show-time embodiment enables a transmitter to send a substantially arbitrary data sequence to the one or more receivers via the first sequence.

The method 30 includes transmitting symbols of a second form from the transmitter to the one or more receivers via the physical communication link during one or more second sequences of communication time slots, e.g., sequences of consecutive time slots (step 34). Each, symbol of the second form will be written as $X(m)$ where "m" indexes the type of symbol of the second form. There are N types of symbols of the second form where N is the number of channels. At a time $t_m$ of one of the second sequences, the step 34 involves transmitting symbols of the second form, $X(m)$, to the physical communication link in the communication time slots of that second sequence. Here, $X(m)$ has a form that is a perturbation of an X, which is a symbol of the first sequence. In particular, each symbol, $X(m)$, of the second form satisfies $X(m)=X+s \cdot E(m)$. In this equation, each $E(m)$ is a basis vector that represents a signal transmitted to the single channel "m".

For example, in the DSL system 10B of FIG. 4, the basis vector $E(m)$ has a nonzero component only for a signal transmitted to the local communication loop 3 labeled by "m". For different m's, each $E(m)$ may be, e.g., a sine wave for the local communication loop labeled by "m". Different local DSL subscriber loops would correspond to different values of "m". But, $E(m)$ would represent a sine wave of the same frequency, i.e., the same DSL tone.

In some DSL systems, each E(m) may alternatively represent one frequency DSL tone on a single local communication loop, i.e., DSL subscriber line. Then, for different values of "m", the local communication loop and/or DSL tone may change.

In the above equation for X(m), the X's can be, e.g., symbols of the digital symbol constellation for the first form symbols of the first sequences. In a quiet-time embodiment, the transmitter may transmit X(m)'s that satisfy X(m)=X+s·E(m) for the same preset sequences of X's that can be transmitted at the step 32. For example, the preset sequence of X's may be a fixed pilot sequence or may be a sequence of null signals. In a show-time embodiment, the transmitter may transmit second form symbols X(m)'s that satisfy X(m)=X+s·E(m) for X's that differ from those of the step 32. A show-time embodiment can transmit substantially arbitrary data content in the first and second sequences used to estimate the channel matrix, H. If the step 34 includes transmitting multiple second sequences, the channel "m" and corresponding basis vector E(m) can differ in different ones of the second sequences.

In each second sequence, the scale factor, s, which defines the form of the second form symbols therein, has a fixed magnitude, δ. The magnitude of δ may be large or small compared to the magnitude of the X's of the first form symbols. In some embodiments, the scale factor, s, has the same value for each time slot of a second sequence. In other embodiments, the scale factor, s, has a sign that alternates so that the corresponding second sequence of scale factors is an AC current that is differentially detectable in the one or more receivers.

The method 30 includes transmitting symbols of a third form from the transmitter to the one or more receivers via the physical communication link during one or more third sequences of communication time slots, e.g., consecutive time slots (step 36). For a third sequence transmitted at about time $t_{m,n}$, the step 36 involves transmitting symbols, i.e., X(m, n)'s, whose forms are again perturbations of the first forms that symbols can have in the first sequence. In particular, each symbol, X(m, n) satisfies X(m, n)=X+s·(E(m)+E(n))/(2)$^{0.5}$ where E(m) and E(n) are the above-described basis vectors related to the channels "m" and "n", and "X" is a first form symbol that could be transmitted in the first sequence. For example, the X's in this equation can again belong to the digital symbol constellation for the first form symbols of the first sequences. In the quiet-time embodiment, the transmitter may transmit X(m, n)'s that satisfy X(m, n)=X+s·(E(m)+E(n))/(2)$^{0.5}$ for the same X's transmitted at the step 32 or for the same preset sequence transmitted at the step 32. For example, the preset sequence of X's may be a fixed pilot sequence or may be a sequence of null signals. In a show-time embodiment, the transmitter transmits symbols X(m, n)'s that satisfy X(m, n)=X+s·(E(m)+E(n))/(2)$^{0.5}$. Here, the temporal sequence of X's can differ from that transmitted at the step 32, because a show-time embodiment can transmit a substantially arbitrary data content in the third sequences. If the step 36 includes transmitting multiple third sequences, the channel(s) "m" and/or "n" and the corresponding basis vector(s) E(m) and/or E(n) can vary for different ones of the third sequences.

The method 30 includes transmitting symbols of a fourth form from the transmitter to the one or more receivers via the physical communication link during one or more fourth sequences of communication time slots, e.g., consecutive time slots (step 38). For a fourth sequence at time $t'_{m,n}$, the step 38 involves transmitting symbols, i.e., X'(m, n)'s, which also have perturbed forms with respect to the symbols of first form in the first sequence. In particular, each such symbol, X'(m, n) satisfies X'(m, n)=X+s·(E(m)+ph·E(n))/(2)$^{0.5}$ where the same types of E(m) and E(m) are orthogonal normalized basis vectors; "ph" is a fixed phase, e.g., exp(iπ/2); and "X" is again a symbol of the first form. For example, the X's of this equation can be in the digital symbol constellation for symbols of the first form in the first sequence. In a quiet-time embodiment, the transmitter may transmit X'(m, n)'s that satisfy X'(m, n)=X+s·(E(m)+ph·E(n))/(2)$^{0.5}$ for the same preset sequence of X's transmitted at the step 32. For example, the preset sequence of X's may be a fixed pilot sequence or may be a sequence of null signals. In a show-time embodiment, the transmitter may transmit symbols X'(m, n)'s that satisfy X'(m, n)=X+s·(E(m)+ph·E(n))/(2)$^{0.5}$ for X's that differ from those transmitted at the step 32. Again, the show-time embodiment can transmit substantially arbitrary data content in the fourth sequences. If the step 38 includes transmitting multiple fourth sequences, the channel(s) "m" and/or "n" corresponding to the basis vector(s) E(m) and/or E(m) may change for different fourth sequences.

In each third and fourth sequence, the scale factor, s, has the same magnitude, δ, as discussed with respect to the step 34. The scale factor, s, may have the same value for each time slot of the third and fourth sequences or may have values that alternate in sign in such sequences to enable its differential detection at receiver(s).

The method 30 includes receiving values of channel SINRs that were measured for the first, second, third, and fourth sequences of communication time slots (step 40). The transmitter receives the measured channel SINRs or evaluates them from properties directly indicative thereof as received from the receiver(s) and can identify the sequences whose channel SINR are received.

The method 30 further includes evaluating a magnitude of one or more off-diagonal elements of the channel matrix from the channel SINRs or single-channel SINRs, which are received at the step 40 and are measured for the first and second sequences of time slots (step 42). For the channel k, the corresponding single channel SINR at time "t" will be denoted as SINR$_k$[t]. Each SINR$_k$[$t_m$] may be determined from measurements of received per-channel powers for the time slots of one second sequence at time "$t_m$". For example, the one or more receivers measure(s) E(|Y$_k$(m)−d$_k$·X$_k$|$^2$) or E(|Y$_k$(m)|$^2$) over the time slots of the second sequence at time "$t_m$". Similarly, each SINR$_k$[$t_0$] is determined from receiver measurements of received single-channel powers for time slots of the first sequence at time "$t_0$" or by averages thereof over a few neighboring frequency bands, e.g., measurements of E(|Y$_k$−d$_k$·X$_k$|$^2$) or E(|Y$_k$|$^2$) over the time slots of the first sequence. The estimation of each off-diagonal element of the channel matrix uses the channel SINRs received at the step 40.

Since a transmitted data symbol, X(m), of a second sequence at the time $t_m$ has the form X+s·E(m), the objects E(|Y$_k$(m)|$^2$) and E(|Y$_k$(m)−d$_k$·X$_k$|$^2$) for such a second sequence have the forms:

$$E(|Y_k(m) - d_k X_k|^2)|_{t_m} = E(|Y_k - d_k X_k + s(H \cdot E(m))_k|^2)|_{t_0} \quad (2a)$$
$$\approx E(|Y_k - d_k X_k|^2)|_{t_0} + |sH_{k,m}|^2$$

and $$E(|Y_k(m)|^2)|_{t_m} = E(|Y_k + s \cdot (H \cdot E_m)_k|^2)|_{t_0} \quad (2b)$$
$$\approx E(|Y_k|^2)|_{t_0} + |s|^2 |H_{k,m}|^2$$

In eqs. (2a) and (2b), the linear "s" term is expected to substantially average to a value whose magnitude is small compared to |s|, provided that the second sequences are long enough. That is, a long second sequence averages the linear "s" term over a set of X's whose projections onto channel "m" are typically approximately random so that the linear "s" term has a small magnitude. From equations (2a)-(2b) and (1a)-(1b), the $SINR_k[t_m]$ of the second sequence at time "$t_m$" can be rewritten as:

$$SINR_k[t_m] = \frac{|d_k|^2 P_k}{E(|Y_k - d_k X_k|^2)|_{t_0} + |s|^2 |H_{k,m}|^2} \quad (3a)$$

$$SINR_k[t_m] = \frac{|d_k|^2 P_k}{E(|Y_k|^2)|_{t_0} - |d_k|^2 P_k + |s|^2 |H_{k,m}|^2}. \quad (3b)$$

From eq. (3a) or (3b) for $SINR_k[t_m]$ and eq. (1a) or (1b) for $SINR_k[t_0]$, the (k, m)-th off-diagonal element of the channel matrix, H, can be shown to be given by:

$$|H_{k,m}|^2 = \frac{|d_k|^2 P_k}{|s|^2} \left( \frac{1}{SINR_k[t_m]} - \frac{1}{SINR_k[t_0]} \right). \quad (4)$$

Eq. (4) can be used to evaluate magnitudes of off-diagonal elements of the channel matrix, H, from received measurements of channel SINRs. Indeed, at above step 42, the transmitter may evaluate the right-hand side of eq. (4) based on the received values of $SINR_k[t_0]$ and $SINR_k[t_m]$, a preselected and known value of |s|, and measurements by the transmitter and/or one or more receivers of $d_k$ and $P_k$.

In an embodiment of the method 30 that transmits a single second sequence of symbols, i.e., X(m)'s, the evaluating step 42 can determine the magnitude of each off-diagonal element, $H_{k,m}$, for which a corresponding channel-k SINR is received at the receiving step 40. If the receiving step 40 includes receiving the channel SINRs for each channel, the evaluating step 42 can be performed to determine the off-diagonal elements of the entire m-th column of the channel matrix, H.

If an embodiment of the method 30 involves transmitting multiple second sequences of data symbols, i.e., X(n)'s for n≠m, the evaluating step 42 can determine the magnitudes of off-diagonal elements in one or more other columns of the channel matrix, H.

If an embodiment of the method 30 includes transmitting N second sequences where N is the dimension of the channel matrix, the evaluating step 42 can be performed to determine magnitudes of all off-diagonal element of the channel matrix.

The method 30 also includes estimating a phase of one or more off-diagonal elements of the channel matrix, H, from channel SINRs that are received at step 40 and are measured for the first, second, third, and fourth sequences of time slots (step 44). Each $SINR_k[t_{m,n}]$ for a third sequence is obtained from the one or more receivers' measurement of received channel powers for time slots of the third sequence of time $t_{m,n}$, e.g., measurements of $E(|Y_k(m, n)-d_k \cdot X_k|^2)$ or $E(|Y_k(m, n)|^2)$ over the time slots of the third sequence of time $t_{m,n}$. Each $SINR_k[t'_{m,n}]$ for a fourth sequence is determined from the one or more receivers' measurements of single-channel powers for time slots of the fourth sequence of time $t'_{m,n}$, e.g., measurements of $E(|Y'_k(m, n)-d_k \cdot X_k|^2)$ or $E(|Y'_k(m, n)|^2)$ over time slots of the fourth sequence of time $t'_{m,n}$ or by averages thereof over a few neighboring frequency bands.

In some embodiments, the estimating step 44 determines the relative phase(s) of the one or more off-diagonal elements based on equations describing temporal averages over time slots of the third and fourth sequences. In a third sequence of time $t_{m,n}$, a transmitted data symbol, X(m, n), has the form $X+s \cdot (E(m)+E(n))/(2)^{0.5}$. Thus, the objects $E(|Y_k(m, n)|^2)$ and $E(|Y_k(m, n)-d_k \cdot X_k|^2)$, which are averaged over said third sequence, have the forms:

$$E(|Y_k(m, n) - d_k X_k|^2)|_{t_{m,n}} = E(|Y_k - d_k X_k + s[H \cdot E_m + \quad (5a)$$
$$H \cdot E_n]/\sqrt{2}|^2)|_{t_0}$$
$$\approx E(|Y_k - d_k X_k|^2)|_{t_0} +$$
$$\frac{|s|^2}{2} \cdot |H_{k,m} + H_{k,n}|^2$$
$$\approx E(|Y_k - d_k X_k|^2)|_{t_0} +$$
$$\frac{|s|^2}{2} \cdot [|H_{k,m}|^2 + |H_{k,n}|^2 +$$
$$2|H_{k,m}| \cdot |H_{k,n}| \cdot$$
$$\cos(\phi_{k,m} - \phi_{k,n})]$$

and $$E(|Y_k(m, n)|^2)|_{t_{m,n}} \approx E(|Y_k|^2)|_{t_0} + \frac{|s|^2}{2} [|H_{k,m}|^2 + \quad (5b)$$
$$|H_{k,n}|^2 + 2|H_{k,m}| \cdot$$
$$|H_{k,n}| \cos(\phi_{k,m} - \phi_{k,n})].$$

Herein, $H_{km} = M_{km} \cdot \exp(i^{SM}_{k,m})$ where $M_{km}$ and $\phi_{k,m}$ are the respective magnitude and phase of $H_{km}$. In the fourth sequence of time $t'_{m,n}$, a transmitted data symbol, X'(m, n), has the form $X+s \cdot (E(m)+ph \cdot E(n))/(2)^{0.5}$. Thus, if "ph" is "i", the objects $E(|Y'_k(m, n)|^2)$ and $E(|Y'_k(m, n)-d_k \cdot X_k|^2)$ that are averaged over said fourth sequence have the forms:

$$E(|Y'_k(m, n) - d_k X_k|^2)|_{t'_{m,n}} = E(|Y_k - d_k X_k + s[H \cdot E_m + \quad (6a)$$
$$e^{i\pi/2} H \cdot E_n]/\sqrt{2}|^2)|_{t_0}$$
$$\approx E(|Y_k - d_k X_k|^2)|_{t_0} +$$
$$\frac{|s|^2}{2} \cdot |H_{k,m} + e^{i\pi/2} H_{k,n}|^2$$
$$\approx E(|Y_k - d_k X_k|^2)|_{t_0} +$$
$$\frac{|s|^2}{2} \cdot [|H_{k,m}|^2 + |H_{k,n}|^2 +$$
$$2|H_{k,m}| \cdot |H_{k,n}| \cdot$$
$$\sin(\phi_{k,m} - \phi_{k,n})]$$

and $$E(|Y'_k(m, n)|^2)|_{t'_{m,n}} \approx E(|Y_k|^2)|_{t_0} + \frac{|s|^2}{2} [|H_{k,m}|^2 + \quad (6b)$$
$$|H_{k,n}|^2 + 2|H_{k,m}| \cdot$$
$$|H_{k,n}| \sin(\phi_{k,m} - \phi_{k,n})].$$

From eqs. (1a), (1b), (2a), (2b), (5a), (5b), (6a), and (6b), it can be seen that the channel SINRs at times $t_0$, $t_m$, $t_{m,n}$, and $t'_{m,n}$ define the cosine and sine of a phase of an off-diagonal element of the channel matrix, H, relative to the phase of an on-diagonal element of the channel matrix, H. For example, it follows that:

$$\cos(\phi_{k,m} - \phi_{k,n}) = \qquad (6a)$$

$$\frac{\left(\frac{1}{SINR_k[t_{m,n}]} - \frac{1}{2 \cdot SINR_k[t_m]} - \frac{1}{2 \cdot SINR_k[t_n]}\right)}{\sqrt{\left(\frac{1}{SINR_k[t_m]} - \frac{1}{SINR_k[t_0]}\right) \cdot \left(\frac{1}{SINR_k[t_n]} - \frac{1}{SINR_k[t_0]}\right)}}$$

and $$\sin(\phi_{k,m} - \phi_{k,n}) = \qquad (6b)$$

$$\frac{\left(\frac{1}{SINR_k[t'_{m,n}]} - \frac{1}{2 \cdot SINR_k[t_m]} - \frac{1}{2 \cdot SINR_k[t_n]}\right)}{\sqrt{\left(\frac{1}{SINR_k[t_m]} - \frac{1}{SINR_k[t_0]}\right) \cdot \left(\frac{1}{SINR_k[t_n]} - \frac{1}{SINR_k[t_0]}\right)}}.$$

Thus, in some embodiments, the step 44 may involve evaluating the right-hand sides of eqs. (6a) and (6b) to evaluate phase(s) of one or more of the off-diagonal elements in a column of the channel matrix, H, relative to a phase of a diagonal element of the same column. The step 44 may involve evaluating the right-hand sides of eqs. (6a) and (6b) with a measured value of $SINR_k[t_0]$, and measured values of $SINR_k[t_m]$'s, $SINR_k[t_{m,n}]$'s, and $SINR_k[t'_{m,n}]$'s that are received at the receiving step 40.

In various embodiments, the step 44 may or may not include determining the absolute phase of the one or more off-diagonal elements of the channel matrix, H. In some embodiments, the step 44 may include adding to the relative phase of an off-diagonal element a measured absolute phase of the diagonal element of the same column of the channel matrix, H. The phase of said diagonal element may be, e.g., a phase for the direct channel gain, $d_k$. In other embodiments, the step 44 does not find an absolute phase of such off-diagonal elements. For example, the transmitter may include a precoder configured to diagonalize the physical communication link based on magnitudes and relative phases of the off-diagonal elements therein as determined by the method 30. Such a diagonalization may be performed without a need for the absolute phases of the off-diagonal elements. Instead, the relative phases of said elements with respect to diagonal elements of the same columns may suffice for performing such a diagonalization of the channel matrix, H, by such a precoder.

If an embodiment of the method 30 involves transmitting only one third sequence and only one fourth sequence, phase estimation step 44 can be performed to determine a relative phase of off-diagonal element(s) for which corresponding channel-k SINR's were received at the step 40. If the receiving step 40 includes receiving channel SINRs for N−1 channels, the phase estimation step 44 may be performed to evaluate relative phases of the off-diagonal elements of the whole m-th column of the channel matrix, H.

If an embodiment of the method 30 involves transmitting multiple second, third and fourth sequences of data symbols, the step 44 may be performed in a manner to obtain relative phases of off-diagonal elements of the channel matrix in multiple columns of the channel matrix.

If an embodiment of the method 30 involves transmitting multiple second, third, and fourth sequences of data symbols, the method 30 can be performed to evaluate such a relative phase of each off-diagonal element of the channel matrix, H.

In other embodiments of methods 20 and/or 30 of FIGS. 2 and 8, the symbols transmitted in the second, third, and/or fourth sequences of steps 32, 34, 36, and 38 may have forms that are different perturbations of the first form symbols transmitted in the first sequence of step 32. For example, each symbol, X", of one or more of such second, third, and/or fourth sequences may be related to symbols, i.e., X's, of the constellation of the first sequence by the relation X"=Q·X or alternatively by the relation X"=Q·X+D where Q is a fixed N×N matrix and D is a fixed length-N vector. One would modify the exemplary embodiments of the method 30 of FIG. 8 as described herein to transmit such symbols, X", in the second, third, and/or fourth sequences where channel SINRs are measured and would modify steps 42 and 44 to enable the evaluation of off-diagonal elements of the channel matrix, H.

The transmitter 14 and one or more receivers 16 of FIG. 1 may be made to perform any of the above described embodiments of the method 30 to determine off-diagonal element(s) of the channel matrix for the physical communication link 12. Thus, embodiments of the transmitter 14 may estimate a magnitude and absolute or relative phase of one or more than one off-diagonal element of the channel matrix, H.

Figure 9:
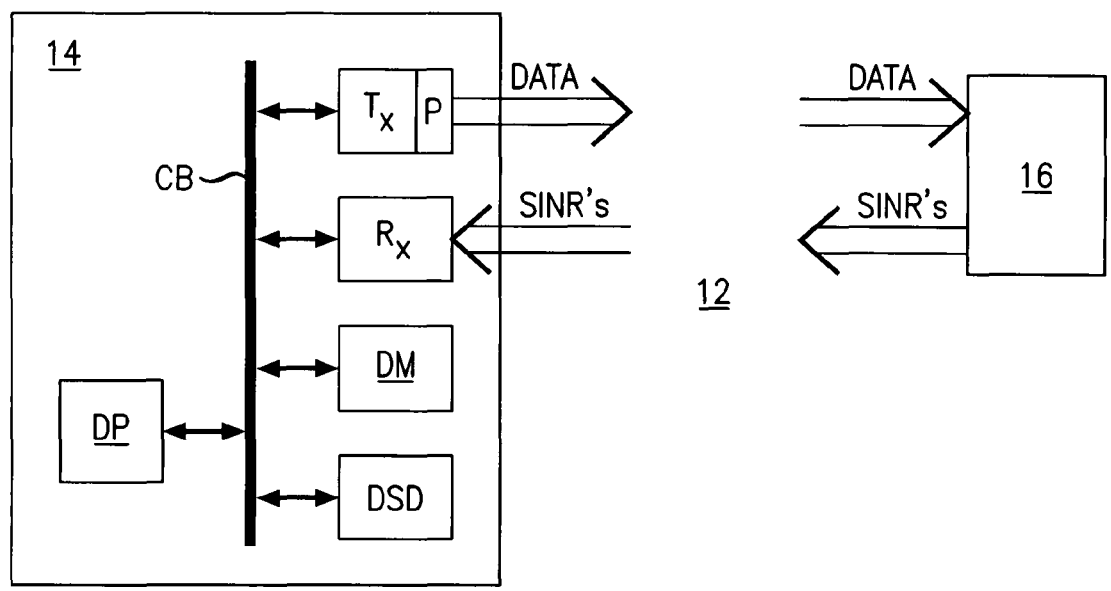
FIG. 9 is a block diagram illustrating an embodiment of a transmitter that implements the method of FIG. 2, e.g., in one of the multi-channel communication systems of FIGS. 1 and 3-7.

FIG. 9 illustrates an exemplary transmitter 14 for use in the communication system 10 of FIG. 1. The exemplary transmitter 14 is configured to perform the steps of methods 20 and 30 as shown in FIGS. 2 and 8. The transmitter 14 includes a transmitter device (Tx), a receiver device (Rx), a digital processor (DP), an active digital memory (DM), a data storage device (DSD), and a communications bus (CB). The transmitter device Tx is configured and connected to transmit N symbol streams to the N channels supported by the physical communication link 12 such that the data streams are transmitted to the receiver 16. The receiver device Rx is connected to receive symbols from the receiver 16, e.g., via the physical communication link 12. In particular, the receiver device Rx is capable of receiving per-channel SINRs from the receiver 16 and is configured or controllable to store said per-channel SINRs to the active digital memory DM. The digital processor DP is configured to control the transmitter Tx and receiver Rx and to execute programs stored in the active digital memory DM. The active digital memory DM stores one or more programs of instructions, wherein the one or more programs are in form(s) executable by the digital processor DP. The one or more programs include instructions that execute the steps of methods 20 and 30 of FIGS. 2 and 8. The active digital memory DM may also store data for use in executing said instructions, e.g., measured values of channel SINRs received at the step 22 of FIG. 2 and/or the step 40 of FIG. 8. The data storage device DSD may include a magnetic or optical disk and an associated disk reader and/or may include a hard drive. The data storage device DSD stores the programs of instructions for executing the methods 20 and/or 30 of FIGS. 2 and 8. Said programs are stored in forms executable by the digital processor DP. The communications bus CB is configured to support communications between the digital processor DP, the transmitter device Tx, the receiver device Rx, the active digital memory DM, and the data storage device DSD.

The transmitter device Tx may also include a precoder (P) that is configurable and/or controllable by the digital processor DP. In particular, the precoder P can be configured or controlled to cause the transmitter device Tx to transmit data symbols having forms of the first, second, third, and fourth sequences as described in steps 32, 34, 36 and 38 of the method 30 of FIG. 8. In addition, the precoder P may be configurable to apply a linear transformation to the N symbol streams in a manner that effectively diagonalizes the physical communication link 12. That is, the precoder P may apply a linear transformation to the N symbol streams such that their subsequent transformation by transmission over the physical communication link 12 does not substantially mix symbols of different ones of the symbol streams at the one or more receivers 16. The precoder P is configured to perform such an effective diagonalization based on the form of the channel matrix, H, determined by the method 20 and/or 30 of FIGS. 2 and 8. Indeed, the precoder P may be configured based on the magnitudes and relative phases of the off-diagonal elements of the matrix M.

From the disclosure, drawings, and claims, other embodiments of the invention will be apparent to those skilled in the art.

What we claim is:

1. A method, comprises:
   receiving a plurality measurements of signal-to-interference-plus-noise ratios for one or more receivers, the one or more receivers being coupled to a transmitter via a physical communication link, the physical communication link supporting a plurality of communications channels between the transmitter and the one or more receivers; and
   determining a phase of one or more off-diagonal elements of a channel matrix for the physical communication link based on the received plurality of signal-to-interference-plus-noise ratios.

2. The method of claim 1, further comprising:
   transmitting streams of DSL tones from the transmitter to the one or more receivers via the physical communication link.

3. The method of claim 2, wherein each channel corresponds to one of a plurality of DSL tones.

4. The method of claim 1, further comprising:
   transmitting streams of optical symbols from the transmitter to the one or more receivers via different wavelength channels of the physical communication link.

5. The method of claim 1, further comprising:
   transmitting streams of symbols from the transmitter to a plurality of the one or more receivers via wireless transmissions over the physical communication link.

6. The method of claim 1, wherein the signal-to-interference-plus-noise ratios are channel signal-to-interference-plus-noise ratios.

7. The method of claim 6, wherein each determined phase is a relative phase of the one or more off-diagonal elements with respect to another element of the channel matrix.

8. The method of claim 1, wherein each determined phase is a relative phase of the one or more off-diagonal elements with respect to another element of the channel matrix.

9. The method of claim 1, wherein the determining includes evaluating a magnitude of said one or more off-diagonal elements.

10. The method of claim 9, further comprising:
    preceding a plurality of symbol streams and transmitting the symbols of said precoded symbol streams to said physical communication channel such that different symbol streams do not substantially mix at the one or more receivers.

11. An apparatus, comprising:
    a transmitter configured to transmit symbols to one or more receivers via a plurality of communication channels of a physical communication link; and
    wherein the transmitter is configured to estimate a phase of one or more off-diagonal elements of a channel matrix for the physical communication link based on values of signal-to-interference-plus-noise ratios at the one or more receivers.

12. The apparatus of claim 11, wherein the transmitter is configured to evaluate a phase of the one or more off-diagonal elements based on values of channel signal-to-interference-plus-noise ratios.

13. The apparatus of claim 11, wherein the transmitter includes a precoder capable of performing preceding that effectively diagonalizes the physical communication link.

14. The apparatus of claim 11, wherein the transmitter is configured to evaluate relative phases of the off-diagonal matrix elements of the channel matrix from said values of signal-to-interference-plus-noise ratios.

15. The apparatus of claim 11, wherein the transmitter is configured to transmit the symbols via DSL tones.

16. The apparatus of claim 11, wherein the transmitter is configured to transmit streams of optical symbols to the physical communication link over different wavelength channels.

17. The apparatus of claim 11, wherein the transmitter is wireless MIMO transmitter.

* * * * *